United States Patent
Riffe et al.

(10) Patent No.: US 7,386,302 B2
(45) Date of Patent: Jun. 10, 2008

(54) HOTLINE ROUTING OF PRE-ACTIVATED GSM SUBSCRIBERS USING PSEUDO-MSISDNS

(75) Inventors: Scott E. Riffe, Bellevue, WA (US); Steven I. Carlson, Kenmore, WA (US); Gregory A. Wong, Mercer Island, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 783 days.

(21) Appl. No.: 10/162,304

(22) Filed: Jun. 4, 2002

(65) Prior Publication Data

US 2002/0193100 A1 Dec. 19, 2002

Related U.S. Application Data

(60) Provisional application No. 60/295,729, filed on Jun. 4, 2001.

(51) Int. Cl.
*H04Q 7/20* (2006.01)

(52) U.S. Cl. ............ 455/417; 455/418; 455/445; 455/435.1

(58) Field of Classification Search .......... 455/417, 455/428, 433, 445, 418, 435.1, 432.1; 379/57–59
See application file for complete search history.

(56) References Cited

U.S. PATENT DOCUMENTS

| | | | |
|---|---|---|---|
| 5,483,672 A | 1/1996 | Sasuta | |
| 5,485,505 A | 1/1996 | Norman et al. | |
| 5,548,586 A | 8/1996 | Kito et al. | |
| 5,603,084 A * | 2/1997 | Henry et al. | 455/419 |
| 5,625,885 A | 4/1997 | Nakazawa et al. | |
| 5,675,628 A | 10/1997 | Hokkanen | |
| 5,748,720 A | 5/1998 | Loder | |
| 5,854,982 A * | 12/1998 | Chambers et al. | 455/445 |
| 5,878,339 A | 3/1999 | Zicker et al. | |
| 5,887,249 A | 3/1999 | Schmid | |
| 5,887,253 A * | 3/1999 | O'Neil et al. | 455/418 |
| 5,918,175 A | 6/1999 | Tayloe et al. | |

(Continued)

FOREIGN PATENT DOCUMENTS

EP   0 820 206   1/1998

(Continued)

OTHER PUBLICATIONS

Vedder, "The Subscriber Identity Module," 8 pages [downloaded from the World Wide Web on Sep. 12, 2001].

(Continued)

*Primary Examiner*—Joseph Feild
*Assistant Examiner*—Michael Vu
(74) *Attorney, Agent, or Firm*—Davis Wright Tremaine LLP; Michael J. Donohue; Heather M. Colburn (57) ABSTRACT

The present invention relates to hotline routing of calls originating from mobile stations. The hotline routing conserves MSISDNs for valid subscribers and provides a relatively generic solution. In one example, a computer system stores in a location register a subscriber profile with an IMSI and a pseudo-MSISDN. A mobile station (which includes a SIM with the IMSI) originates a call. After translation of the pseudo-MSISDN, a serving MSC routes the call to a service activation center.

21 Claims, 3 Drawing Sheets

U.S. PATENT DOCUMENTS

| | | |
|---|---|---|
| 5,920,814 A | 7/1999 | Sawyer et al. |
| 5,937,352 A | 8/1999 | Courtney et al. |
| 5,954,817 A | 9/1999 | Janssen et al. |
| 5,956,636 A | 9/1999 | Lipsit |
| 5,970,059 A | 10/1999 | Ahopelto et al. |
| 6,003,112 A | 12/1999 | Tetrick |
| 6,014,561 A | 1/2000 | Mölne |
| 6,016,428 A | 1/2000 | Diachina et al. |
| 6,018,656 A | 1/2000 | Shirai |
| 6,035,189 A | 3/2000 | Ali-Vehmas et al. |
| 6,073,015 A | 6/2000 | Berggren et al. |
| 6,073,016 A | 6/2000 | Hulthen et al. |
| 6,097,963 A | 8/2000 | Boltz et al. |
| 6,266,523 B1 | 7/2001 | Cook et al. |
| 6,366,777 B1 | 4/2002 | Uusitalo |
| 6,393,298 B1 * | 5/2002 | Fulton ........................ 455/551 |
| 6,529,727 B1 | 3/2003 | Findikli et al. |
| 6,591,098 B1 | 7/2003 | Shieh et al. |
| 6,647,260 B2 | 11/2003 | Dusse et al. |
| 6,738,622 B1 * | 5/2004 | Stadelmann et al. ..... 455/435.1 |
| 6,826,403 B1 * | 11/2004 | Minborg et al. ............ 455/445 |
| 7,039,403 B2 | 5/2006 | Wong |
| 7,085,567 B1 | 8/2006 | Rajaniemi |
| 2002/0006808 A1 | 1/2002 | Onaka et al. |
| 2002/0197991 A1 | 12/2002 | Anvekar et al. |
| 2003/0083068 A1 | 5/2003 | Wong |
| 2005/0059430 A1 | 3/2005 | Beeman et al. |
| 2006/0116169 A1 | 6/2006 | Park |
| 2006/0142007 A1 | 6/2006 | Wong |
| 2006/0189298 A1 | 8/2006 | Marcelli |

FOREIGN PATENT DOCUMENTS

| | | |
|---|---|---|
| EP | 0 820 206 B1 | 1/1998 |
| WO | WO 00/01187 | 1/2000 |

OTHER PUBLICATIONS

International Telecommunications Union, ITU-T Recommendation E.212, "The International Identification Plan for Mobile Terminals and Mobile Users," 11 pages (Nov. 1998).

Heine, *GSM Networks: Protocols, Terminology, and Implementation*, Artech House, pp. iii-xi, 1-18, 31-38, 125-170, 185-273, and 407-416 (1999).

"GSM Architectures and Interfaces," 20 pages (1998).

"The SS7 Signaling Connection Control Part Relay System," 12 pages [downloaded from the World Wide Web on May 16, 2002].

"Introduction to GSM," 6 pages [downloaded from the World Wide Web on May 14, 2002].

"Centrex, Feature Library," 1 page [downloaded from the World Wide Web on May 15, 2002].

"GSM—Global System for Mobile Communication," 3 pages [downloaded from the World Wide Web on May 15, 2002].

Scourias, "A Brief Overview of GSM," 11 pages [downloaded from the World Wide Web on May 16, 2002].

"Understanding Telecommunications," 21 pages [downloaded from the World Wide Web on May 16, 2002].

Christensen, "Mobile Networking," 6 pages (2000).

* cited by examiner

Software 230 Implementing Hotline Routing of Pre-Activated GSM Subscribers Using Pseudo-MSISDNs

HOTLINE ROUTING OF PRE-ACTIVATED GSM SUBSCRIBERS USING PSEUDO-MSISDNS

RELATED APPLICATION INFORMATION

The present application claims the benefit of U.S. Provisional Patent Application Ser. No. 60/295,729, entitled "Hotline Routing of Pre-Activated GSM Subscribers Using Pseudo MSISDNs," filed Jun. 4, 2001, the disclosure of which is incorporated by reference.

TECHNICAL FIELD

The present application relates to hotline routing of calls originating from GSM mobile stations using pseudo-MSISDNs.

BACKGROUND

When a user buys a mobile telephone, the user often must subscribe to a service plan in order to make and receive calls with the mobile telephone. For example, the user might have to fill out a service order to subscribe to various basic and supplementary services from the network operator (alternatively called the carrier) of a mobile telephone network. An employee of the network operator processes the service order, entering information about the subscriber into a database for the network. After the information is entered, service is activated for the subscriber. This process can be fairly quick, and it works well when subscribers have personal contact with the employee of the carrier, as happens at a store run by the carrier.

When a mobile telephone is sold off-the-shelf at an independent retail outlet, however, the buyer may need guidance to activate service. Simply providing a special number on the packaging or manual for the buyer to call to activate service may not provide adequate guidance in some cases.

To facilitate distribution through independent retail channels, some existing mobile telephone networks support a single number origination (or "hotline routing") feature for pre-activated subscribers. When conventional single number origination is used for a subscriber, any call originating from the subscriber (except 911) is routed to the same number. For a pre-activated mobile telephone, a user buys the mobile telephone off-the-shelf, powers on the phone, dials any number (again, except 911), and the call is routed to an activation center. The user then provides subscriber information, credit card information, subscription choices, etc. over the phone to personnel at the activation center to activate service.

Unfortunately, single number origination as used in certain existing mobile telephone networks does not work well in networks that follow the Global System for Mobile Communication ["GSM"] standard. In much of the world, mobile telephones operate according to the GSM standard. In fact, the GSM standard is becoming more popular in North America. To understand why single number origination (as supported in existing networks) does not work well in GSM networks, it helps to have some background knowledge about GSM networks

I. GSM Networks

Figure 1:
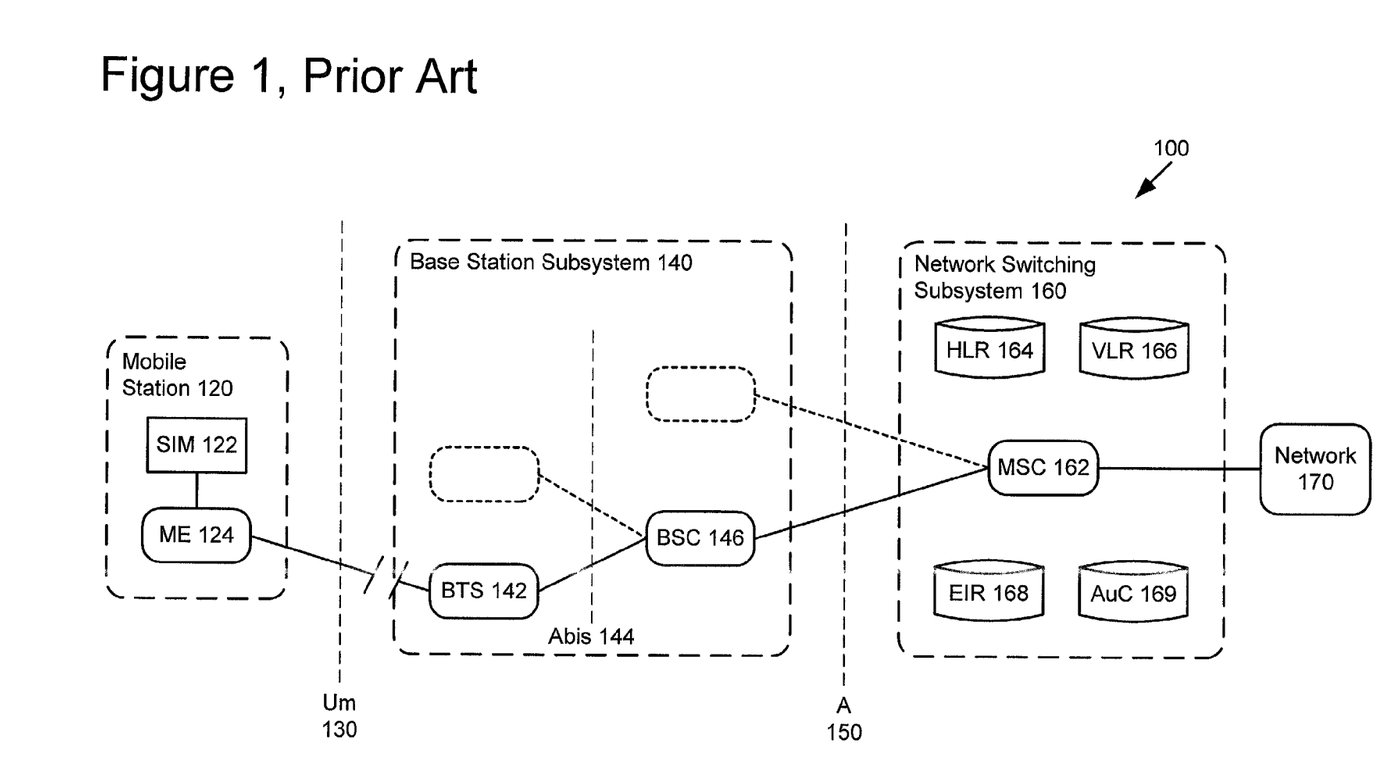
FIG. 1 is a block diagram of part of a generalized GSM network according to the prior art.

The GSM standard is a collection of technical documents and agreements that address the network infrastructure for GSM service. FIG. 1 shows part of a generalized GSM network (100) according to the prior art. At a high level, the GSM network (100) includes a mobile station (120), a base station subsystem ["BSS"] (140), and a network switching subsystem ["NSS"] (160). In practice, a GSM network can include an arbitrary number of certain entities (e.g., mobile station, BSS, MSC) shown in FIG. 1. Moreover, for the sake of simplicity, FIG. 1 omits certain entities (e.g., operations and maintenance center, business systems). For additional information about GSM networks, see, e.g., Gunnar Heine, *GSM Networks: Protocols, Terminology, and Implementation*, Artech House, Boston (1999) and the GSM-related specifications referenced therein. Some telecommunications networks (e.g., third generation networks) extend the GSM architecture, complying with the GSM standard in various respects while enhancing service in other respects.

A. Mobile Station

The mobile station (120) includes mobile equipment ["ME"] (124) and a subscriber identity module ["SIM"] (122) (alternatively called a SIM card or smart card). To provide personal mobility for a subscriber, the SIM (122) is often detachable such that the subscriber can join the SIM (122) with another ME to receive/make calls or use other services with that ME.

The ME (124) (sometimes called the terminal) is a mobile telephone, other kind of telephone, personal digital assistant or other computer, or other device with GSM capability. A terminal identification, or international mobile equipment identity ["IMEI"], uniquely identifies the ME (124). The IMEI can be used to reduce trafficking in black market equipment.

The SIM (122) installs or inserts into the ME (124). The SIM (122) is usually the size of a credit card or a small plug-in unit. The SIM (122) includes a microprocessor and memory that stores subscriber-related data such as an international mobile subscriber identity ["IMSI"]. After a mobile subscriber integrated service digital network number ["MSISDN"] has been provisioned for the SIM, the SIM (122) may (but need not) store the MSISDN.

The subscriber identification, or IMSI, uniquely identifies the subscriber in any GSM system. The IMSI includes three parts: a mobile country code ["MCC"] consisting of three digits, a mobile network code ["MNC"] consisting of two or three digits, and a mobile subscriber identity number ["MSIN"] consisting of up to ten digits. For example, consider the IMSI 310555123456789. The first three digits "310" are the MCC for the United States, the next three digits "555" are the MNC for the home network of the subscriber within the country, and the final nine digits "123456789" are the MSIN identifying the subscriber within the network. The IMSI is not the subscriber's phone number. In general, the subscriber will never see the IMSI or need to remember it. For additional detail about IMSIs, see International Telecommunications Union ["ITU"] Recommendation ITU-T E.212.

Conventionally, a SIM vendor provides a set of GSM SIMs in bulk for a carrier. The carrier gets a file listing the IMSIs for the SIMs. The IMSIs each begin with the appropriate MCC and MNC for the carrier, and then include an MSIN.

The subscriber dialable number, or MSISDN, is assigned to the subscriber as the subscriber's phone number. The MSISDN and IMSI are never the same number and have different formats. (In contrast, in time division multiple access ["TDMA"] networks, the subscriber's phone number (the mobile dialable number) and the subscriber's mobile identification number ["MIN"] may be the same number.) A MSISDN includes a 1 to 3 digit country code, a 3-digit national destination code (i.e., an area code in the United States), and a variable length subscriber number. In North America, the subscriber's MSISDN is an eleven-digit number composed of the country code "1" and ten digits for the area code and subscriber number, for example, 12065551234. For additional detail about MSISDNs, see the relevant GSM standards or ITU Recommendation ITU-T E.164.

The mobile station (120) communicates with the BSS (140) across the Um interface (130), which is often called the air interface. The air interface (130) and other standardized interfaces shown in FIG. 1 facilitate interoperation between equipment from different manufacturers.

B. Base Station Subsystem

The BSS (140) includes a base transceiver station ["BTS"] (142) and a base station controller ["BCS"] (146) that communicate across the Abis interface (144). As shown in FIG. 1, the BSS (140) may include additional BTSs and BSCs. The BSS (140) communicates with the NSS (160) across the A interface (150).

The BTS (142) contains one or more radio transceivers that transmit and receive information over the air interface (130). The radio transceivers provide coverage to a geographic area and define a cell for the GSM network (100).

The BSC (146) manages the radio resources for the BTS (142) and other BTSs for specified cells of the GSM network (100). In particular, the BSC (146) participates in setup of various aspects of the air interface, (130), frequency hopping, and call handoffs from cell to cell in the GSM network (100).

C. Network Switching Subsystem

The NSS (160) performs switching for calls involving GSM network (100) users. The main component of the NSS (160) is the MSC (162), which operates in conjunction with the home location register ["HLR"] (164), the visiting location register ["VLR"] (166), the equipment identity register ["EIR"] (168), and the authentication center ["AuC"] (169). Depending on implementation and role in the GSM network, a NSS may lack certain components shown in the NSS (160) of FIG. 1 or share a component with one or more other NSSs. In one common configuration, each of multiple MSCs for a carrier is implemented with and controlled by a VLR, and each shares a single logical HLR for the carrier with the other MSCs. Depending on implementation, the database components may be distributed or implemented at a single location.

The MSC (162) performs many of the switching functions of a normal switching node of a public switched telephone network ["PSTN"] or integrated services digital network ["ISDN"] and (indirectly or directly) connects to the outside network (170). In addition, the MSC (162) provides functionality for handling mobile subscribers, including registration, authentication, location updating, call handoffs, and call routing. In some implementations, a MSC can perform a translation based upon the MSISDN of a calling subscriber. For example, in the MSC translation system of a MSC produced by Nortel Networks ["Nortel"], the TNUM selector allows the MSC to make a decision based upon the MSISDN of a subscriber who originates a call. MSCs from other vendors may provide the same or similar functionality.

The HLR (164) is a database that stores information about subscribers in the GSM network (100). Much of the information is relatively permanent, for example, information identifying a subscriber by IMSI and indicating services for the subscriber. Parts of a subscriber's HLR profile indicate whether the subscriber uses different bearer services for telephony, short message service, facsimile, and/or circuit-switched data, etc. A bearer service can have its own associated MSISDN, or several bearer services (e.g., telephony and short message service) can share a MSISDN. If a subscriber uses telephony bearer service, a corresponding MSISDN field of the subscriber's HLR profile needs a value for the telephony bearer service to work. In some implementations, each MSISDN in the HLR (164) must be unique—the same MSISDN cannot appear in multiple subscriber profiles.

Essentially, the HLR (164) stores information about a subscriber needed to load a VLR when the subscriber appears in the service area of that VLR. Particularly when the subscriber is not in his or her home system (i.e., roaming), the HLR (164) stores information about the current location of the subscriber, which typically includes the address of a VLR in which the subscriber is currently registered.

The VLR (166) is a database that stores selected information from the HLR (164) for subscribers currently visiting a geographic area serviced by the VLR (166). The VLR (166) uses the information to set up, control, and track calls and other subscribed services with mobile stations. For example, for a call involving the mobile station (120), an entry in the VLR (166) includes identifying information for the subscriber, MSISDN, information indicating the last known location area/cells for the mobile station (120), physical attributes of the mobile station (120), and services available to the subscriber. When a call is set up, the entry in the VLR (166) might also store the current cell for the mobile station (120), encryption keys, etc.

The EIR (168) and AuC (169) are used for authentication and security. The EIR (168) is a database that stores a list of IMEIs for MEs, and can be used to identify mobile equipment that has been stolen, etc. The AuC (169) is a database that stores keys and other information used for authentication and encryption.

D. Service Activation for a GSM Network

To make and receive calls using a GSM mobile station in a GSM network, a user activates service with a GSM carrier. For example, the user provides personal information such as name and address, billing information such as a credit card number, service choices for basic and supplementary services, etc. To activate service for the subscriber, a MSISDN is assigned to the subscriber for voice services and information for the subscriber is entered into the HLR for the GSM carrier.

E. Registration on a GSM Network

When a GSM mobile station is powered on, the mobile station (more specifically, the SIM) registers in a GSM network. A similar registration may occur when the mobile station changes locations in the GSM network or occur periodically to check the location of the mobile station.

After establishing a connection with a BSS, the mobile station sends a message to the MSC for the geographic area in which the subscriber is currently located. The message includes information identifying the subscriber. Initially, the identifying information is the IMSI, but for later registrations might be a temporary mobile subscriber identity ["TMSI"], which is assigned for use instead of the IMSI to complicate unauthorized tracking of mobile subscribers.

The VLR of the visited MSC may already have a record for the subscriber if the subscriber previously registered in the visited MSC. For example, the record includes identifying information for the subscriber, MSISDN, and supplementary service information. If the visited MSC has a record, the MSC authenticates the subscriber, and optionally authenticates the mobile equipment and assigns a new TMSI.

On the other hand, the VLR of the MSC may lack a record for the subscriber if the subscriber has never powered on the mobile station or has not registered in the visited MSC recently. In this case, the visited MSC uses the IMSI/TMSI to determine the subscriber's HLR. Through the subscriber's HLR (and perhaps a VLR in which the subscriber was previously registered), the visited MSC gets authentication information and authenticates the subscriber. The location of the subscriber is updated in the subscriber's HLR record and, if the subscriber was previously registered in another VLR, subscriber data is removed from that VLR. The VLR of the visited MSC then receives subscriber data for the subscriber, for example, identifying information for the subscriber, MSISDN, and supplementary service information.

F. Mobile Originating Calls in a GSM Network

When a GSM mobile station originates a call in a GSM network, the mobile station establishes a connection with a BSS and sends a message to the MSC in which the mobile station is registered. The message requests a connection with the MSC, specifying information identifying the subscriber (e.g., IMSI or TMSI).

After the MSC confirms the connection and authenticates the subscriber, the mobile station sends a setup message to the MSC that includes the number (e.g., the called MSISDN) dialed by the subscriber. The MSC routes the call to one or more other MSCs or switching nodes in other networks to set up the connection with the called party. This can involve locating a roaming subscriber, routing the call to another network, etc. Assuming the negotiations and connections between various components succeed and the called party accepts the call, the active phase of the call begins. When either party ends the call, the mobile station, BSS, and MSC release the resources used for the call.

II. Single Number Origination

To facilitate distribution of mobile telephones through independent retail channels, existing TDMA networks support hotline routing for pre-activated subscribers. In addition, several proprietary mechanisms have been proposed or implemented for hotline routing in GSM networks.

A. Hotline Routing for Pre-Activated Subscribers in TDMA Networks

The architecture of TDMA networks is similar in some respects to the architecture of GSM networks. For instance, a HLR in a TDMA network includes records with information about subscribers. A subscriber's profile includes a MIN as well as an electronic serial number ["ESN"] for the mobile telephone of the subscriber.

TDMA networks explicitly support single number origination. To implement this feature, the HLR profile for a pre-activated mobile telephone is provisioned with a MIN and ESN. In addition, the HLR profile includes a particular value (i.e., Origination Indicator=8) and the hotline number. When a user powers on the mobile telephone, the mobile telephone registers with a visited MSC. When the user dials a number, the visited MSC checks the profile for the pre-activated mobile telephone, detects the setting Origination Indicator=8, and routes the call to the hotline number. This feature is specified in Intermediate Standard 41 for existing TDMA networks.

B. Hotline Routing in GSM Networks

The GSM standard does not provide for single number origination as in TDMA networks. To address this problem, several mechanisms have been implemented or proposed which force originations from a particular GSM subscriber to a single hotline number by changing the subscriber's profile. In one common scenario, calls originated by an activated but delinquent subscriber are routed to a collections department. The subscriber is also barred from receiving calls, roaming, etc. Once the subscriber resolves the problem with the delinquent account, the hotline routing is removed.

These mechanisms are typically used for hotline routing of activated subscribers, not pre-activated subscribers. While several of the mechanisms could be used for pre-activated subscribers, there would be several disadvantages to doing so.

First, to the extent a mechanism uses settings or other features of a HLR profile for hotline routing, a MSISDN must be provisioned for the HLR profile. The MSISDN will not be in use for some period of time before service activation. In many countries, there are an insufficient number of available MSISDNs to justify assigning a MSISDN that will not be used for some indefinite period of time.

Second, to the extent a mechanism is proprietary to a vendor (for example, due to reliance on vendor-specific features, equipment, or messaging protocols), the mechanism ties a carrier to the vendor. This can prevent or at least complicate combining equipment from different vendors.

Nortel provides a non-intelligent network ["non-IN"], proprietary mechanism for hotline routing in GSM networks. Implementation requires Nortel MSC/VLRs and a Nortel HLR. To turn on hotline routing, a subscriber's HLR profile includes a Nortel Network Class of Service ["NCOS"] feature associated with a hotline number. The proprietary feature is passed as part of the subscriber profile in GSM mobile application part messages. The Nortel MSCs include translations from different NCOSs to different hotline numbers associated with the NCOSs. Thus, when the activated subscriber originates a call, the call is routed to the hotline number associated with the NCOS of the subscriber. The Nortel non-IN mechanism could be used for pre-activation hotline routing, but would require a profile in a Nortel HLR (with a MSISDN provisioned). Also, the Nortel non-IN solution will not roam outside of the configured network, nor will it work with another vendor's MSC/VLR or HLR.

Nortel also provides an intelligent network ["IN"] proprietary mechanism for hotline routing in GSM networks. Implementation requires Nortel MSC/VLRs, a Nortel HLR, and a Nortel service control point ["SCP"], which is a database that supplies translation and data needed for certain advanced services. To turn on hotline routing, a subscriber's HLR profile sets up the subscriber for virtual private network service with the SCP. In the SCP, the subscriber is provisioned as a virtual private network/hotline routing subscriber. The Nortel SCP is also configured with the hotline numbers. When a subscriber originates a call, the SCP provides a hotline number, and the call is routed to the hotline number. The Nortel IN mechanism could be used for pre-activation hotline routing, but would require a profile in a Nortel HLR (with a MSISDN provisioned). Moreover, at present, the Nortel IN solution does not easily roam outside of the configured network or work with another vendor's MSC/VLR, SCP, or HLR.

The GSM standard establishes four network-definable barring types that can be used to impose restrictions on subscribers. A network operator could use a mobile network-specific barring type in a subscriber's HLR profile to indicate to MSCs on the mobile network that hotline routing should be used for the subscriber. This mechanism does not easily roam outside the mobile network of the operator, since different carriers might use the same barring type for a different functionality. Moreover, to the extent the mechanism relies on settings in a subscriber HLR profile for hotline routing, it requires that a MSISDN be provisioned. In addition, the MSC translations required to implement the hotline routing can be relatively complex.

SUMMARY

The present invention relates to hotline routing of calls originating from mobile stations. The hotline routing conserves MSISDNs for valid subscribers and provides a relatively generic, rather than proprietary, solution. The hotline routing includes various aspects.

According to a first aspect, a computer system stores a subscriber profile in a location register. The profile includes an IMSI and a pseudo-MSISDN. The pseudo-MSISDN includes, for example, the MSIN portion of the IMSI after plural digits that distinguish the pseudo-MSISDN from valid MSISDNs. For a call originating from a mobile station that includes a SIM with the IMSI, this facilitates hotline routing with translation of the pseudo-MSISDN.

According to a second aspect, a MSG processes a call originating from a mobile station. The MSC routes the call to a hotline number based at least in part upon translation of a calling party MSISDN associated with the mobile station. For example, the MSC uses a selector to relate the calling party MSISDN to hotline routing.

According to a third aspect, a mobile station initiates registration with a serving MSC. The mobile station, which includes a SIM with an IMSI, originates a call. After translation of a MSISDN for the mobile station in the serving MSC, the serving MSC routes the call to a service activation center.

Additional aspects, features, and advantages of the invention will be made apparent from the following detailed description of described embodiments that proceeds with reference to the accompanying drawings.

DETAILED DESCRIPTION

Described embodiments are directed to hotline routing of pre-activated subscribers using pseudo-MSISDNs. The hotline routing does not require provisioning of valid MSISDNs to pre-activated subscribers, thereby conserving valid MSISDNs. Moreover, the hotline routing is not necessarily dependent on a particular SIM vendor, MSC/VLR vendor, or HLR vendor, nor does it necessarily require proprietary messaging.

In one common scenario, a customer buys a GSM mobile station (e.g., mobile telephone) off-the-shelf and powers it on. A HLR profile for the SIM of the mobile station includes a pseudo-MSISDN, which is a dummy value placed in the MSISDN field of the HLR profile. When the customer originates a call to any number (except a number like 911), a serving MSC performs a translation of the pseudo-MSISDN for the calling mobile station, and the call is routed to a service activation center for the network operator.

In some implementations, the pseudo-MSISDN for the SIM is an 11-digit MSISDN including plural leading digits (e.g., "10" or "11") and the last 9 digits of the IMSI for the SIM card. Several points and direct implications of this numbering scheme and its relation to hotline routing should be noted.

First, North American MSISDNs are 11-digits and begin with "1". Area codes do not begin with "0" or "1", so no valid subscriber in the world has an MSISDN starting with "10" or "11". If the North American area code system changed such that valid MSISDNs could begin with "10", the pseudo-MSISDNs could begin with some other sequence of digits. In a country outside of North America, the format of the pseudo-MSISDN differs as necessary to define MSISDNs for hotline routing in that country, for example, using leading digits that no valid subscriber MSISDN uses in that country.

Second, IMSIs identify SIMs, and MSINs identify subscribers of a particular carrier. Using MSINs as the last part of pseudo-MSISDNs guarantees that each of the pseudo-MSISDNs is unique for a particular carrier. Duplicate MSISDNs in the carrier's HLR are avoided, and the carrier need not track pseudo-MSISDNs since they can be derived from IMSIs. In other implementations, the pseudo-MSISDNs can use some series of digits other than MSINs.

Third, the serving MSC has the ability to route subscriber originations based on the subscriber's MSISDN.

In the hotline routing of described embodiments, a mobile network supports service according to GSM standards. Alternatively, a mobile network that implements hotline routing using pseudo-MSISDNs supports some other type of service.

The hotline routing of the described embodiments includes several techniques and systems. While the techniques and systems are typically described herein as part of a single, integrated mechanism, the techniques and systems can be applied separately, potentially in combination with other techniques and systems.

Table 1 lists some acronyms and abbreviations used in the present application.

TABLE 1

| Acronyms and abbreviations | |
|---|---|
| Short Form | Full Term |
| AuC | Authentication Center |
| BSC | Base Station Controller |
| BSS | Base Station Subsystem |
| BTS | Base Transceiver Station |
| EIR | Equipment Identity Register |
| ESN | Electronic Serial Number |
| GSM | Global System for Mobile Communication |
| HLR | Home Location Register |
| IMEI | International Mobile Equipment Identity |
| IMSI | International Mobile Subscriber Identity |
| IN | Intelligent Network |
| ISDN | Integrated Services Digital Network |
| ITU | International Telecommunications Union |
| MCC | Mobile Country Code |
| ME | Mobile Equipment |
| MIN | Mobile Identification Number |

TABLE 1-continued

Acronyms and abbreviations

| Short Form | Full Term |
|---|---|
| MNC | Mobile Network Code |
| MSC | Mobile Switching Center |
| MSIN | Mobile Subscriber Identity Number |
| MSISDN | Mobile Subscriber Integrated Services Digital Network Number |
| NCOS | Network Class of Service |
| NSS | Network Switching Subsystem |
| PSTN | Public Switched Telephone Network |
| SCP | Service Control Point |
| SIM | Subscriber Identity Module |
| TDMA | Time Division Multiple Access |
| TMSI | Temporary Mobile Subscriber Identity |
| VLR | Visiting Location Register |

I. Computing Environment

Figure 2:
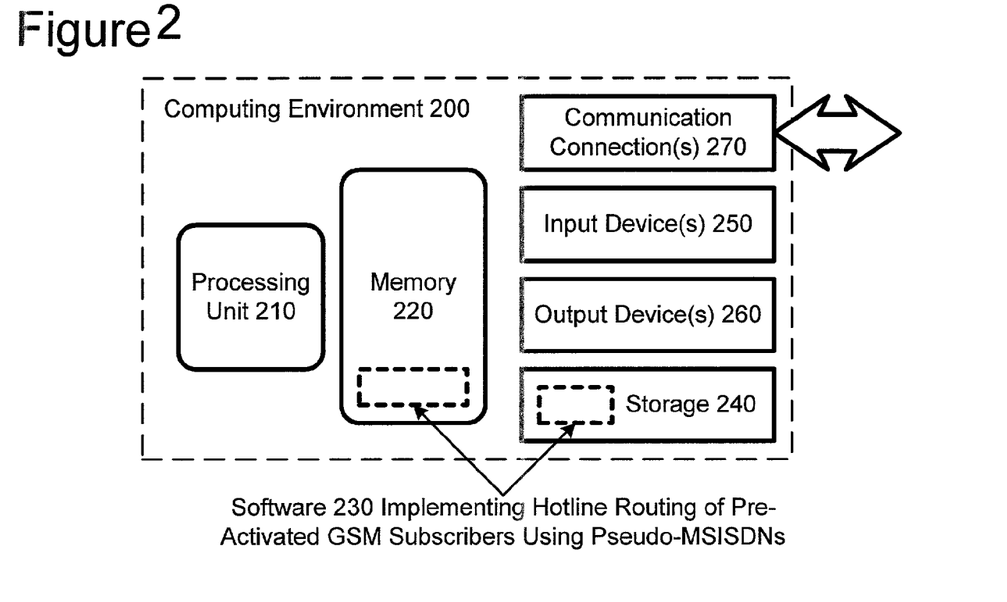
FIG. 2 is a block diagram of a suitable computing environment in which described embodiments may be implemented.

FIG. 2 illustrates a generalized example of a suitable computing environment (200) in which described embodiments may be implemented. The computing environment (200) is not intended to suggest any limitation as to scope of use or functionality of the invention. The present invention may be implemented in diverse general-purpose or special-purpose computing environments. For example, certain aspects of the present invention may be implemented in a mobile station, while other aspects may implemented in a MSC or other network subsystem.

With reference to FIG. 2, the computing environment (200) includes at least one processing unit (210) and memory (220). The processing unit (210) executes computer-executable instructions and may be a real or a virtual processor. In a multi-processing system, multiple processing units execute computer-executable instructions to increase processing power and/or divide tasks. The memory (220) may be volatile memory (e.g., registers, cache, RAM), non-volatile memory (e.g., ROM, EEPROM, flash memory, etc.), or some combination of the two. The memory (220) stores software (230) implementing some aspect of hotline routing of pre-activated GSM subscribers using pseudo-MSISDNs.

A computing environment may have additional features. For example, the computing environment (200) includes storage (240), one or more input devices (250), one or more output devices (260), and one or more communication connections (270). An interconnection mechanism (not shown) such as a bus, controller, or network interconnects the components of the computing environment (200). Typically, operating system software (not shown) provides an operating environment for other software executing in the computing environment (200), and coordinates activities of the components of the computing environment (200).

The storage (240) may be removable or non-removable, and includes magnetic disks, magnetic tapes or cassettes, CD-ROMs, CD-RWs, DVDs, and/or any other medium which can be used to store information and which can be accessed within the computing environment (200). The storage (240) may store computer-executable instructions for the software (230) implementing some aspect of hotline routing of pre-activated GSM subscribers using pseudo-MSISDNs.

The input device(s) (250) may be a touch input device such as a numerical keypad, keyboard, keypad, mouse, pen, or trackball, a voice input device, a scanning device, and/or another device that provides input to the computing environment (200). The output device(s) (260) may be a display, printer, speaker, CD-writer, and/or another device that provides output from the computing environment (200).

The communication connection(s) (270) enable communication over a communication medium to another computing entity. The communication medium conveys information such as computer-executable instructions, voice data, or other data in a modulated data signal. A modulated data signal is a signal that has one or more of its characteristics set or changed in such a manner as to encode information in the signal. By way of example, and not limitation, communication media include wired or wireless media implemented with a radio frequency, electrical, optical, infrared, acoustic, or other physical carrier.

Embodiments can be described in the general context of computer-readable media. Computer-readable media are any available media that can be accessed within a computing environment. By way of example, and not limitation, with the computing environment (200), computer-readable media include memory (220), storage (240), communication media, and combinations of any of the above.

Embodiments can be described in the general context of computer-executable instructions, such as those included in program modules, being executed in a computing environment on a target real or virtual processor. Generally, program modules include routines, programs, libraries objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "detect," "translate," and "store" to describe computer operations in a computing environment. These terms are high-level abstractions for operations performed by a computer, and should not be confused with acts performed by a human being. The actual computer operations corresponding to these terms vary depending on implementation.

II. Assigning and Loading Pseudo-MSISDNs

Figure 3:
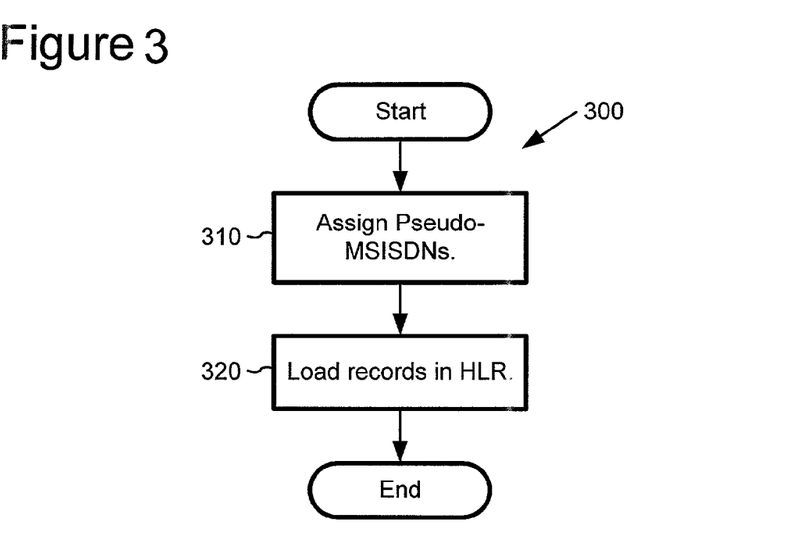
FIG. 3 is a flowchart illustrating a technique for configuring HLR records to support hotline routing of pre-activated subscribers using pseudo-MSISDNs.

FIG. 3 illustrates a technique (300) for configuring HLR records to support hotline routing of pre-activated subscribers using pseudo-MSISDNs. The technique (300) does not depend on any particular vendor's equipment.

An operator of a GSM network assigns (310) a pseudo-MSISDN to each of multiple GSM SIM cards for pre-activated subscribers. By assigning a pseudo-MSISDN to a GSM SIM card, the SIM card is able to register on the GSM network of the operator prior to assigning service.

In some implementations, the pseudo-MSISDN is an 11-digit MSISDN including the digits "10" and the last 9 digits of the IMSI for the SIM card. North American MSISDNs are 11 digits long and begin with "1". Since area codes do not start with "0" or "1", the network operator can safely assume that no valid subscriber in the world would have an MSISDN beginning with "10" or "11".

When a SIM vendor produces a SIM for a network operator in the United States (or certain other countries), the SIM's IMSI is 15 digits long and composed of three parts: the 3-digit MCC, a 3-digit MNC, and a 9-digit MSIN. The 9-digit MSIN is unique within the mobile network of the operator, and the SIM does not conflict with other valid SIMs. As noted above, a HLR may require that each MSISDN in the HLR be unique. When the last 9 digits of the IMSI are used as the last part of a pseudo-MSISDN, each of the pseudo-MSISDNs is unique in the network of the operator.

Next, the operator loads (320) records in the HLR for the operator, each record including the IMSI and pseudo-MSISDN for a GSM SIM. When the pseudo-MSISDNs are unique within the GSM network of the operator, the HLR can be bulk loaded with the correct pseudo-MSISDN for each pre-activated SIM without fear of duplicate MSISDNs or IMSIs. In addition, the business systems for the operator need not track or manage pseudo-MSISDNs since the pseudo-MSISDNs are derived from the IMSI.

III. Hotline Routing Using Pseudo-MSISDNs

Figure 4:
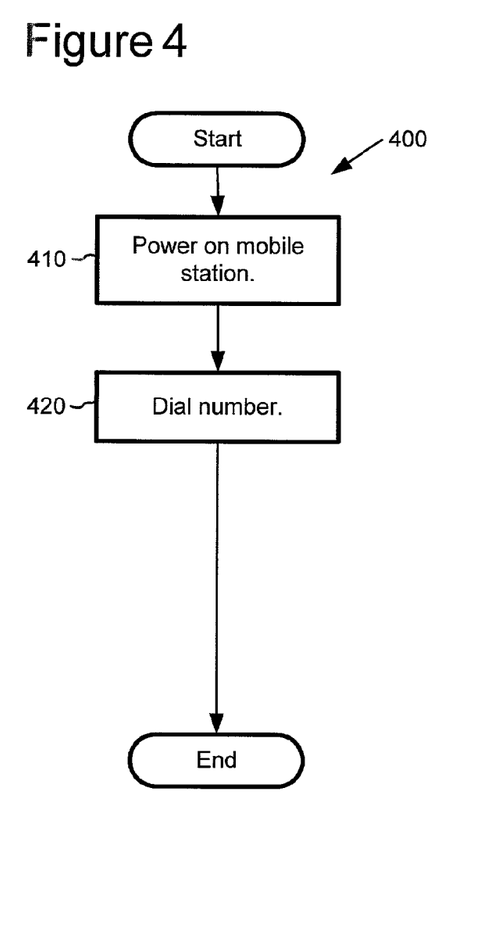
FIGS. 4 and 5 are flowcharts illustrating techniques in a mobile station and MSC, respectively, for hotline routing of a pre-activated subscriber using a pseudo-MSISDN.
Figure 5:
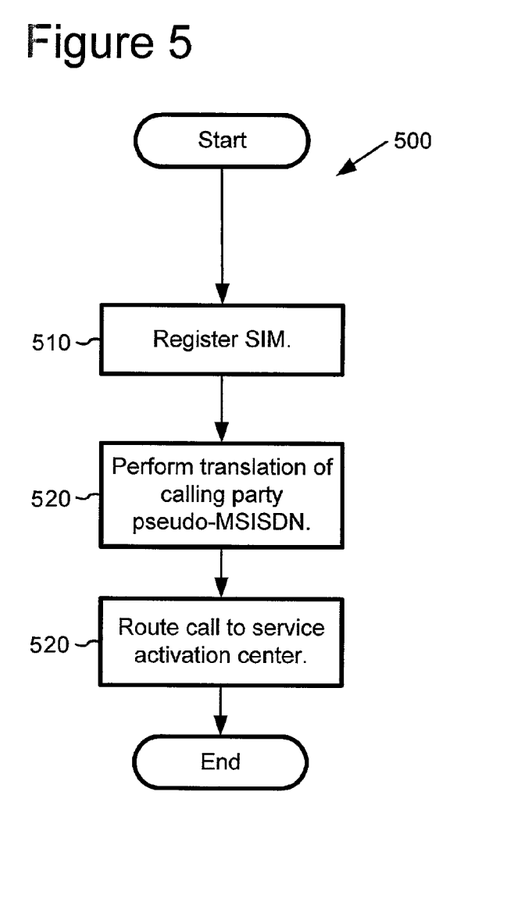

FIGS. 4 and 5 illustrate techniques (400, 500) in a mobile station and a MSC, respectively, for hotline routing of a pre-activated subscriber using a pseudo-MSISDN. To implement hotline routing for pre-activated GSM subscribers, MSCs for the network of a carrier are configured to route originations from SIMs with MSISDNs starting with certain digits (e.g., "10") to the service activation center for the carrier. Even "611" calls (to repair/customer service) go to the activation center since the SIMs are not yet for valid subscribers, but calls to emergency services are treated normally.

With reference to FIGS. 4 and 5, a user powers on (410) a GSM mobile station such as a mobile telephone. In reaction, the SIM for the mobile station registers (510) with a serving MSC of the GSM network. (As noted above, as part of the GSM registration process, the serving MSC/VLR gets profile information for the pre-activated GSM subscriber. The profile information includes identifying information for the subscriber and MSISDN (pseudo-MSISDN in this instance)).

The serving MSC supports routing originations from a subscriber by performing origination translation based on the calling subscriber's MSISDN. The Nortel GSM MSC supports this functionality; other vendor's MSCs may support this functionality or a similar functionality. In the serving MSC, a range of MSISDNs (e.g., those beginning with "10") is pre-defined to route to a single number rather than a dialed number.

After the user dials (420) a number and the mobile station originates a call, the serving MSC performs (520) a translation of the pseudo-MSISDN for the SIM card of the mobile station and routes (530) the call to the service activation center for the carrier. For example, the serving MSC performs the MSC translation to route all originations from a certain calling subscriber MSISDN range to a single number using the TNUM selector in the Nortel MSC translation system. This implies that the MSISDNs for pre-activated SIMs are in the same range (e.g., all starting with "10").

The pre-activated subscribers are not allowed to register outside of the mobile network of the carrier. Accordingly, other carriers do not encounter the pseudo-MSISDNs for the pre-activated subscribers of the carrier or detect the hotline routing mechanism. Alternatively, the carrier establishes roaming partnerships with one or more other carriers to support hotline routing for pre-activated subscribers that roam outside the mobile network of the carrier.

A second carrier could in theory use pseudo-MSISDNs that begin with the same digits (e.g., "10") as the pseudo-MSISDNs of a first carrier. If so, and if the second carrier allowed pre-activated subscribers to roam on the mobile network of the first carrier, those pre-activated subscribers would be routed to the activation center of the first carrier on originations. To prevent this, the MSC of the first carrier could look at the subscriber's IMSI as well as the pseudo-MSISDN. For example, if a subscriber originates a call, and the subscriber has an MSISDN beginning with "10", and the subscriber has an IMSI starting with the MCC and MNC of the first carrier, then the origination is routed to a customer care center for the first carrier, otherwise the call is routed somewhere else.

Having described and illustrated the principles of our invention with reference to certain described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general-purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A computer-readable medium storing computer-executable instructions for causing a Mobile Switching Center ("MSC") programmed thereby to perform a method comprising:

storing a subscriber profile including an International Mobile Subscriber Identity ("IMSI") and a pseudo-Mobile Subscriber Integrated Services Digital Network Number ("MSISDN") in a location register, the pseudo-MSISDN including plural leading digits that distinguish the pseudo-MSISDN from valid MSISDNs;

after receiving a call originating from a mobile station including a Subscriber Identity Module ("SIM") with the IMSI, translating the pseudo-MSISDN as a calling party pseudo-MSISDN for the call, translating the the pseudo-MSISDN including recognizing the calling party pseudo-MSISDN as being in a format defined for hotline routing; and if the calling party MSISDN is in the format defined for hotline routing, routing the call to a service activation center;

if the calling party MSISDN is not in the format defined for hotline routing, determining whether routing instructions are present in the location register associated with the IMSI;

if routing instructions are present in the location register, routing the call in accordance with the routing instructions; and if routing instructions are not present in the location register, routing the call to a call recipient.

2. The computer-readable medium of claim 1, wherein the pseudo-MSISDN includes a Mobile Subscriber Identity Number ("MSIN") portion of the IMSI.

3. The computer-readable medium of claim 1 wherein the location register is a Home Location Register ("HLR").

4. The computer-readable medium of claim 1 wherein the method further comprises repeating the storing for one or more additional subscriber profiles.

5. The method of claim 4, wherein each stored subscriber profile includes a unique pseudo-MSISDN within a MSISDN range.

6. The method of claim 1 wherein the pseudo-MSISDN is based at least in part upon the IMSI of the SIM.

7. The method of claim 1 wherein the plural leading digits are "10."

8. A method comprising:
storing a subscriber profile including an International Mobile Subscriber Identity ("IMSI") and a pseudo Mobile Subscriber Integrated Services Digital Network Number ("MSISDN") in a location register, the pseudo-MSISDN being in a format defined for hotline routing and including plural digits that distinguish the pseudo-MSISDN from valid MSISDNs;
after receiving a call originating from a mobile station including a Subscriber Identity Module ("SIM") with the IMSI, translating a calling party MSISDN associated with the mobile station, the translation including determining whether the calling party MSISDN is in a format defined for hotline routing;
if the calling party MSISDN is in the format defined for hotline routing, routing the call originating from the mobile station to a hotline number;
if the calling party MSISDN is not in the format defined for hotline routing, determining whether routing instructions are present in the location register associated with the IMSI
if routing instructions are present in the location register, routing the call in accordance with the routing instructions; and
if routing instructions are not present in the location register, routing the call to a call recipient.

9. The method of claim 8 being performed by a Mobile Switching Center ("MSC"), the method further comprising, before the routing, registering the mobile station with the MSC.

10. The method of claim 9 wherein the MSC uses a selector to translate the calling party MSISDN.

11. The method of claim 10 wherein the selector associates a MSISDN range as being in a format defined for hotline routing, the MSISDN range including plural MSISDNs, the plural MSISDNs including the calling party MSISDN.

12. The method of claim 11 wherein the selector determines the calling party MSISDN is in a format defined for hotline routing based upon plural leading digits of the plural MSISDNs in the MSISDN range.

13. The method of claim 12 wherein the plural leading digits are "10."

14. The method of claim 11 wherein each of the plural MSISDNs in the MSISDN range further includes a Mobile Subscriber Identity Number ("MSIN") of an International Mobile Subscriber Identity ("IMSI").

15. A computer-readable medium storing computer-executable instructions for causing a mobile station programmed thereby to perform a method comprising:
initiating registration of the mobile station with a serving Mobile Switching Center ("MSC"), the mobile station including a Subscriber Identity Module ("SIM") with an International Mobile Subscriber Identity ("IMSI"); and
originating a call from the mobile station, wherein the serving MSC processing the call from the mobile station:
translates a Mobile Subscriber Integrated Services Digital Network Number ("MSISDN") for the mobile station as a calling party MSISDN, the translation including determining whether the calling party MSISDN is in a format defined for hotline routing;
if the calling party MSISDN is in the format defined for hotline routing, routes the call to a service activation center;
if the calling party MSISDN is not in the format defined for hotline routing, determines whether routing instructions are present in a Home Location Register ("HLR") profile associated with the IMSI;
if routing instructions are present in the HLR, routes the call in accordance with the routing instructions; and
if routing instructions are not present in the HLR, routes the call to a call recipient.

16. The computer-readable medium of claim 15 wherein the initiating occurs when a user powers on the mobile station, and wherein the originating occurs when a user dials any of plural numbers.

17. The computer readable medium of claim 15 wherein the MSISDN includes plural digits that differentiate the MSISDN from MSISDNs of valid subscribers.

18. The computer-readable medium of claim 15 wherein the MSISDN includes a Mobile Subscriber Identity Number ("MSIN") portion of the IMSI.

19. A method comprising:
assigning plural pseudo-Mobile Subscriber Integrated Services Digital Network Numbers ("MSISDNs") for a first plurality of Subscriber Identity Modules ("SIM");
loading the plural pseudo-MSISDNs into Home Location Register ("HLR") profiles, thereby facilitating hotline routing based at least in part upon translations of the plural pseudo-MSISDNs as plural calling party pseudo-MSISDNs in one or more serving Mobile Switching Centers ("MSCs") for calls originating from mobile stations having the first plurality of SIMs, the translations including recognizing the plural calling party pseudo-MSISDNs as being in a format defined for hotline routing;
routing calls originated by a mobile station associated with each of the SIMs in the first plurality of SIMs to a hotline numbers;
assigning plural valid MSISDNs to a second plurality of SIMs, each of the SIMs of the second plurality having a different IMSI;
loading the plural valid MSISDNs into HLR profiles, thereby facilitating call routing based at least in part upon translations of the plural valid MSISDNs as plural calling party valid MSISDNs in the one or more serving MSCs for calls originating from mobile stations having the second plurality of SIMs, the translations including recognizing the plural calling party valid MSISDNs as being in a format not defined for hotline routing; and
using the HLR to route calls originated by a mobile station associated with each of the SIMs in the second plurality of SIMs.

20. The method of claim 19 wherein each of the SIMs of the first plurality has a different International Mobile Subscriber Identity ("IMSI") and each of the plural pseudo-MSISDNs includes a Mobile Subscriber Identity Number ("MSIN") portion of a different IMSI of the first plurality of SIMs.

21. The method of claim 19 wherein each of the plural pseudo-MSISDNs includes plural digits that differentiate the pseudo-MSISDN from the plural valid MSISDNs.

* * * * *